(12) United States Patent
Squires

(10) Patent No.: US 10,589,659 B2
(45) Date of Patent: Mar. 17, 2020

(54) DEVICE FOR ATTACHING AN OBJECT AND METHOD OF ATTACHING AN OBJECT USING THE DEVICE

(71) Applicant: Timothy P. Squires, Williamsburg, MI (US)

(72) Inventor: Timothy P. Squires, Williamsburg, MI (US)

( * ) Notice: Subject to any disclaimer, the term of this patent is extended or adjusted under 35 U.S.C. 154(b) by 0 days.

(21) Appl. No.: 16/506,294

(22) Filed: Jul. 9, 2019

(65) Prior Publication Data

US 2019/0329696 A1    Oct. 31, 2019

Related U.S. Application Data

(62) Division of application No. 15/171,458, filed on Jun. 2, 2016.

(60) Provisional application No. 62/170,352, filed on Jun. 3, 2015.

(51) Int. Cl.
*B60P 7/08* (2006.01)
*B60P 3/079* (2006.01)

(52) U.S. Cl.
CPC ............. *B60P 7/0823* (2013.01); *B60P 3/079* (2013.01)

(58) Field of Classification Search
None
See application file for complete search history.

(56) References Cited

U.S. PATENT DOCUMENTS

| | | | |
|---|---|---|---|
| 272,067 A * | 2/1883 | Lindsay | A45F 5/00 224/220 |
| 356,444 A | 1/1887 | Brown | |
| 479,509 A | 7/1892 | Heaphy, Jr. | |
| 534,946 A | 2/1895 | Bates | |
| 656,431 A | 8/1900 | Stewart | |
| 1,072,285 A | 9/1913 | Wigley | |
| 1,572,289 A | 2/1926 | Hogan | |
| 1,583,343 A | 5/1926 | Henry | |
| 2,229,935 A | 1/1941 | Powers | |
| 2,522,719 A | 9/1950 | Johnson | |
| D185,795 S | 8/1959 | Mirrione | |
| 3,046,045 A | 7/1962 | Campbell | |
| 3,294,299 A | 12/1966 | Brennan | |

(Continued)

FOREIGN PATENT DOCUMENTS

CA    2328340    6/2001

OTHER PUBLICATIONS http://www.strapworks.com/ratchet_straps_p/rs2n.htm, pp. 1-2, Aug. 18, 2016.

*Primary Examiner* — Monica E Millner
(74) *Attorney, Agent, or Firm* — Dinsmore & Shohl LLP

(57) ABSTRACT

A device configured to secure a load to a supporting structure and a method of using the device to secure the load to the supporting structure are provided. The device includes a strap fixed onto itself so as to form a first loop and a pair of free ends. An attachment member includes a body with a pair of support arms disposed on opposite ends of the body. Each of the pair of free ends of the strap are attached to a corresponding support arm, laterally spacing the free ends from each other, giving the device a generally figure 8 dimension. The strap is wrapped around the load and the attachment member is pulled through the first loop and the strap is cinched by pulling on the attachment member. The attachment member is then secured to the supporting structure.

8 Claims, 8 Drawing Sheets

(56) References Cited

U.S. PATENT DOCUMENTS

| | | | |
|---|---|---|---|
| 3,337,175 A | 8/1967 | Acheson | |
| 3,919,740 A | 11/1975 | Scherb | |
| 3,948,203 A | 4/1976 | Matthews | |
| 4,015,762 A * | 4/1977 | Mendillo | A63C 11/025 |
| | | | 294/149 |
| 4,315,641 A | 2/1982 | Larsen | |
| 4,322,077 A | 3/1982 | Van't Hof | |
| 4,355,444 A | 10/1982 | Haney | |
| D289,373 S | 4/1987 | Kimball | |
| D292,385 S | 10/1987 | Udelhofen | |
| 4,885,824 A | 12/1989 | Schwab et al. | |
| 4,958,758 A | 9/1990 | Tipple et al. | |
| 4,982,522 A | 1/1991 | Norton | |
| 5,020,192 A | 6/1991 | Gerlach | |
| 5,159,729 A | 11/1992 | Walker | |
| 5,177,986 A | 1/1993 | Jensen | |
| 5,203,481 A * | 4/1993 | Dobbins | A45F 3/14 |
| | | | 215/396 |
| 5,232,193 A | 8/1993 | Skakoon | |
| 5,325,568 A | 7/1994 | Bruhm | |
| 5,402,557 A | 4/1995 | Dalen | |
| 5,423,644 A | 6/1995 | First, Sr. | |
| 5,603,591 A | 2/1997 | McLellan | |
| 5,673,464 A | 10/1997 | Whittaker | |
| 5,676,508 A | 10/1997 | Weicht | |
| 5,730,346 A | 3/1998 | Adams et al. | |
| 5,758,808 A | 6/1998 | Epps et al. | |
| 5,765,888 A * | 6/1998 | Stack | A45F 3/14 |
| | | | 215/396 |
| 5,797,814 A | 8/1998 | Janes et al. | |
| 5,810,218 A * | 9/1998 | Falcaro | A45F 5/00 |
| | | | 224/148.1 |
| 6,048,145 A | 4/2000 | Pedersen | |
| 6,086,124 A * | 7/2000 | Wang | A45F 3/14 |
| | | | 215/396 |
| 6,113,327 A | 9/2000 | Schrader | |
| 6,113,328 A | 9/2000 | Claucherty | |
| 6,152,664 A | 11/2000 | Dew et al. | |
| 6,163,935 A | 12/2000 | Hinkey | |
| 6,394,720 B1 * | 5/2002 | McCay | B60P 7/0823 |
| | | | 410/100 |
| 6,447,037 B1 | 9/2002 | Crouch | |
| 6,729,511 B2 | 5/2004 | Dent, III | |
| 7,331,493 B2 | 2/2008 | Dent, III | |
| 7,510,246 B2 | 3/2009 | Gruninger | |
| 7,634,842 B2 | 12/2009 | Santisi | |
| 7,993,083 B1 | 8/2011 | Abney | |
| 8,499,754 B2 | 8/2013 | Vergin | |
| 9,162,604 B2 | 10/2015 | Thurlow | |
| 9,168,044 B2 | 10/2015 | Kirkham | |
| 9,339,086 B2 | 5/2016 | Hill | |
| D762,461 S | 8/2016 | Kirkham | |
| 9,433,261 B1 | 9/2016 | Miles | |
| 9,635,925 B2 | 5/2017 | Moreau et al. | |
| 2001/0046424 A1 | 11/2001 | McDonald | |
| 2003/0201377 A1 | 10/2003 | Davis | |
| 2005/0180835 A1 | 8/2005 | Schneider | |
| 2006/135969 A1 | 6/2006 | Assia | |
| 2007/0209165 A1 | 9/2007 | Sorensen et al. | |
| 2014/0007389 A1 | 1/2014 | Leung | |
| 2014/0230196 A1 | 8/2014 | Renderer | |

* cited by examiner

DEVICE FOR ATTACHING AN OBJECT AND METHOD OF ATTACHING AN OBJECT USING THE DEVICE

CROSS-REFERENCE TO RELATED APPLICATIONS

This application is a divisional application of U.S. patent application Ser. No. 15/171,458 filed Jun. 2, 2016 which claims priority of U.S. Provisional Patent Application No. 62/170,352 filed Jun. 3, 2015, the contents of which are incorporated herein by reference.

TECHNICAL FIELD

A device in the shape of a figure 8 configured to attach to a load and a method of attaching said device to a load is provided.

BACKGROUND OF THE INVENTION

Devices used to secure a load to a platform are currently known. However, current devices may require a relatively complex latching mechanism to secure the load. Further, current devices may include multiple straps for engaging the load along a greater surface area relative to a single strap. Accordingly, it remains desirable to have a device configured to attach onto a load relatively simply.

SUMMARY OF THE INVENTION

In one aspect, there is disclosed a device configured to attach onto a load is provided. The device includes a strap and an attachment member. The strap is secured onto itself so as to form a first loop. The free ends of the strap are attached to the attachment member. The attachment member includes a body having a pair of support arms disposed on opposite ends of the body. The free ends of the strap are fixed to a corresponding support arm so as to form a second generally form a figure eight.

In another aspect, there is disclosed a device configured to attach onto a load is provided. The device includes a strap and an attachment member. The strap is secured onto itself so as to form a first loop. Each of the free ends of the strap are secured onto the strap so as to form a strap slit. The free ends of the strap are attached to the attachment member. The attachment member includes a body having a pair of support arms disposed on opposite ends of the body. Each of the strap slits is attached to a corresponding support arm so as to form a second generally form a figure eight.

In yet another aspect, there is disclosed a method of securing a load to a supporting structure is provided. The method includes the step of providing a device. The device includes a strap and an attachment member. The strap is secured onto itself so as to form a first loop. The free ends of the strap are attached to the attachment member. The attachment member includes a body having a pair of support arms disposed on opposite ends of the body. The free ends of the strap are fixed to a corresponding support arm so as to form a second generally form a figure eight. The method proceeds to the step of wrapping the strap around the load, and passing the attachment member through the first loop. The method proceeds to the step of cinching the strap onto the load by pulling on the attachment member. The method may then proceed to the step of securing the attachment member to the supporting structure.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

DETAILED DESCRIPTION OF THE INVENTION

Figure 8:
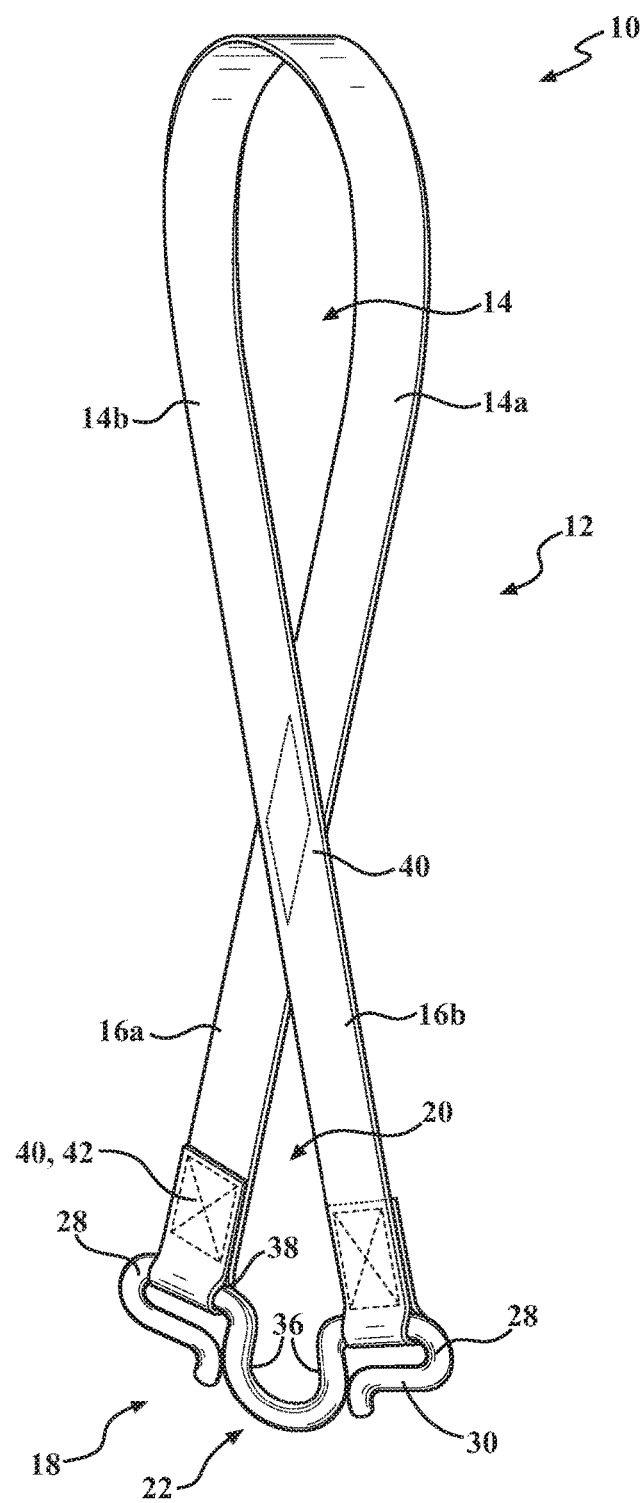
FIG. 8 is a perspective view of the device having a modified attachment member.
Figure 9:
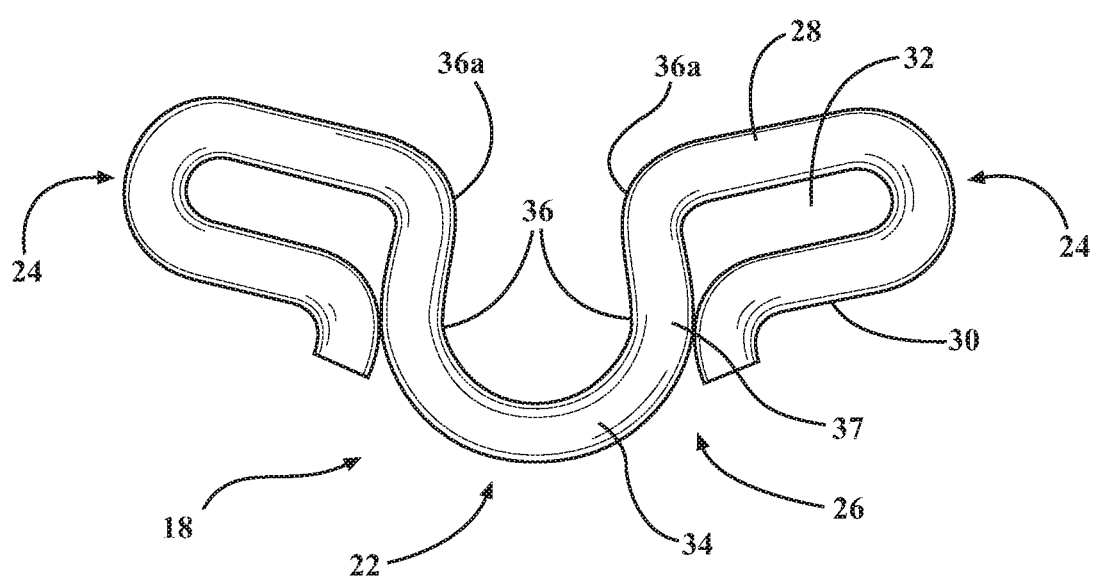
FIG. 9 is a front view of an attachment member.

A device having a strap and an attachment member is provided. The strap is secured onto itself so as to form a loop. The free ends of the strap are attached to the attachment member. The attachment member includes a body having a pair of support arms disposed on opposite ends of the body. The free ends of the strap are fixed to a corresponding support arm so as to form a second generally form a figure 8.

A method of securing a load to a platform is provided. The method includes the step of wrapping the strap around the load and pulling the attachment member through the first loop. The strap is cinched by pulling on the attachment member, closing the strap onto the load. The attachment member is then secured to the platform.

With reference now to FIGS. 1-3, and 5 an illustrative example of the device 10 is provided. The device 10 includes a strap 12. The strap 12 is fixed onto itself so as to form a first loop 14 and a pair of free ends 16a, 16b. The strap 12 may be formed of a pliable and durable material. Preferably the material is weather resistant and configured to withstand abrasion. Preferably, the material is further configured to withstand a pulling load of thousands of pounds. Such material is currently known and used in the art, and illustratively includes a polyester such as nylon. It should be appreciated that the material and the width and thickness of the material used will determine the load capacity of the strap 12. For instance, a two inch strap 12 may be designed to have a breaking strength of 5,500 pounds.

The device 10 further includes an attachment member 18. The attachment member 18 is configured to space the free ends 16a, 16b of the strap 12 apart from each other laterally so as to form a second loop 20 opposite the first loop 14. The attachment member 18 includes a body 22. The body 22 includes a pair of support arms 24. The support arms 24 are disposed on opposite ends of the body 22. Each of the free ends 16a, 16b of the strap 12 are attached to a corresponding support arm 24 so as that the pair of free ends 16a, 16b are laterally spaced apart from each other. Accordingly, the attachment member 18 provides the device 10 with a generally figure 8 dimension.

Figure 1:
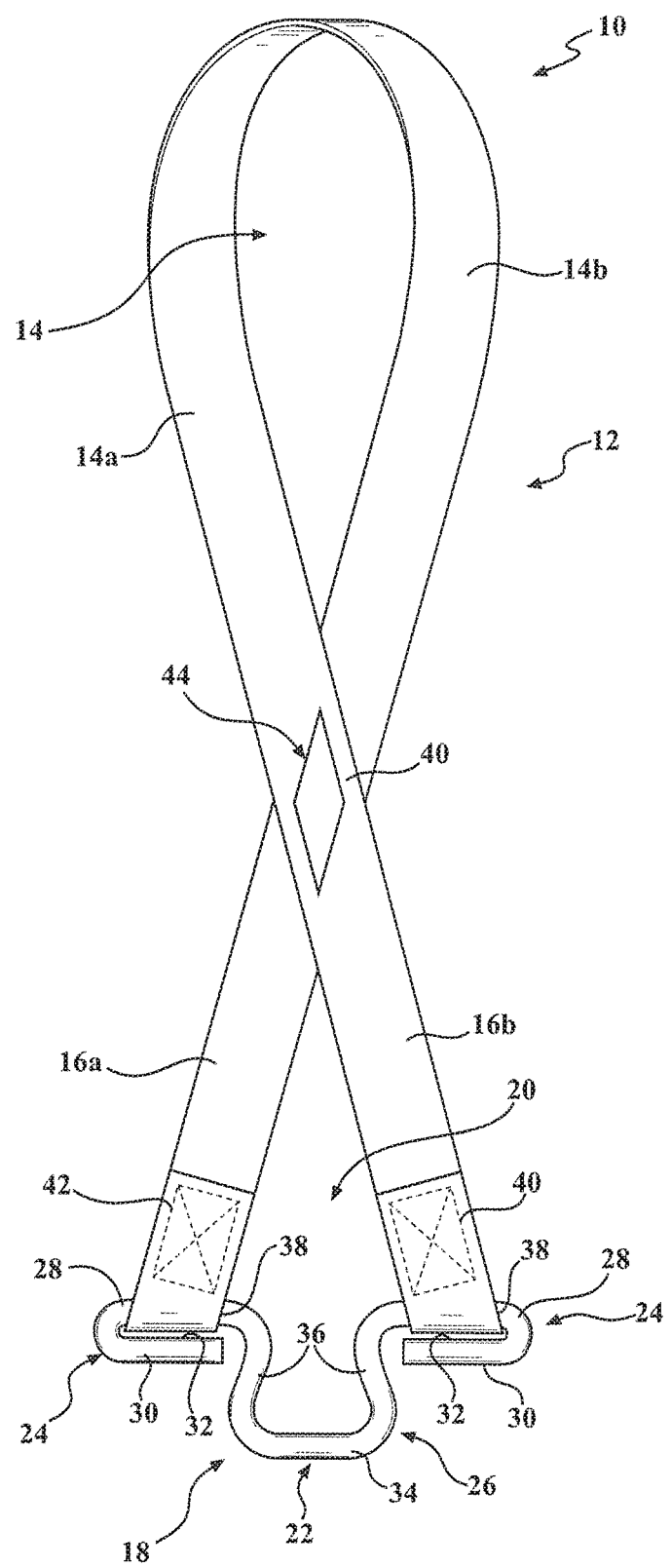
FIG. 1 is a front view of the device.
Figure 2:
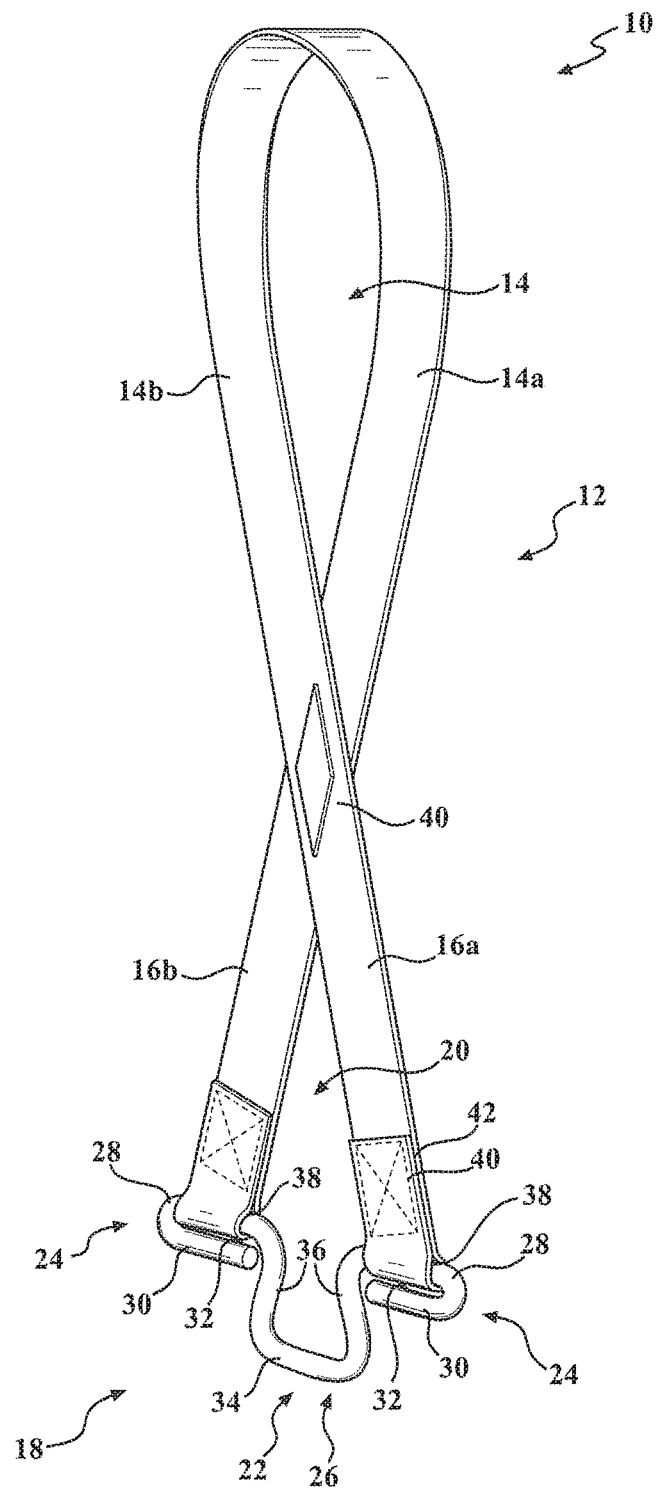
FIG. 2 is a perspective view of the device.
Figure 3:
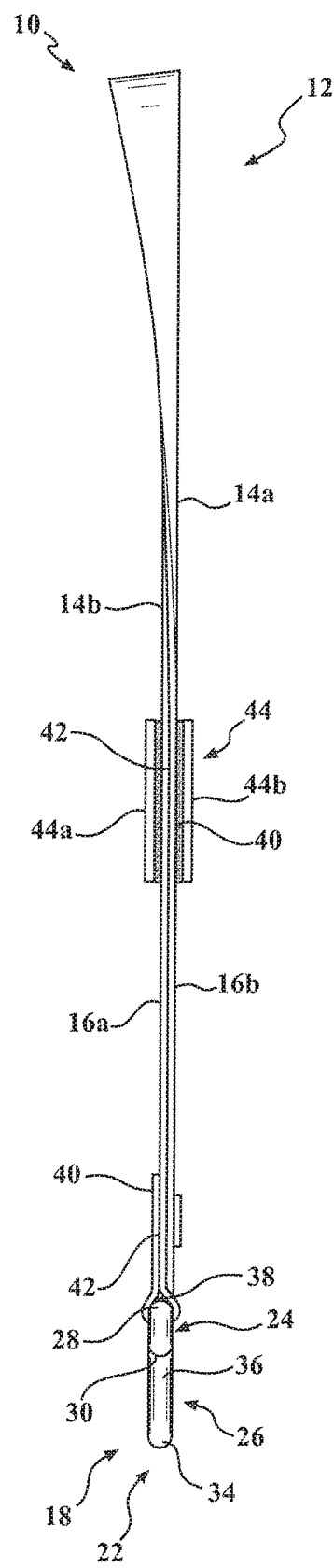
FIG. 3 is a side view of the device with a clamping device.

An exemplary embodiment of the attachment member 18 is provided in FIGS. 1-3. The attachment member 18 may be formed by a rod 26. The rod 26 is formed of a rigid and durable material such as steel, or a composite material such as carbon fiber. The support arms 24 are formed by the rod 26. The rod 26 is bent about the middle so as to form a first elongated member 28 and a second elongated member 30. The first elongated member 28 is spaced apart from and generally parallel to the second elongated member 30 so as to form a support slit 32.

FIGS. 1-3 also provide an illustrative example of the body 22, wherein the body 22 is also formed by a rod 26. The rod 26 is formed of a rigid and durable material such as steel, or a composite material such as carbon fiber. The rod 26 includes a base 34 and a pair of legs 36 disposed on opposing sides of the base 34. The legs 36 curve inwardly towards each other so as to form a generally U-shaped dimension. Each leg 36 of the rod 26 has an end portion 36a. The end portion 36a is curved outwardly from each other, forming a shape similar to that of a horse shoe. The first elongated members 28 of the rod 26 are contiguous with the end portion 36a of a respective leg 36.

The free ends 16a, 16b of the strap 12 are attached to respective first elongated members 28 of the body 22. The free ends 16a, 16b of the strap 12 are secured onto the strap 12 so as to form a strap slit 38. The first elongated member 28 is disposed within the strap slit 38. In assembly, the free ends 16a, 16b of the strap 12 are fed through the support slit 32 and secured onto the strap 12.

The free end portion 16a, 16b may be secured onto the strap 12, and the strap 12 may be secured onto itself to form the first loop 14 using devices or techniques currently known and used in the art such as stitching 40 or an adhesive 42, or a combination of adhesives 42 and stitching 40 wherein the glued portion is reinforced with stitching 40. In another example, a clamping device 44 is used to secure the strap 12 onto itself. Any clamping device currently known and used in the art may be adapted for use herein, illustratively including a clamping device 44 having a first clamp 44a configured to be attached to a second clamp 44b. The first and second clamps 44a, 44b are disposed opposite each other pinching and fixing the strap 12 onto itself, as shown in FIG. 3. It should be readily appreciated by those skilled in the art that the strap 12 may be secured onto itself using combination of a stitching 40, an adhesive 42 and a clamping device 44, or all three.

With reference again to FIGS. 1-3, the first loop 14 includes a first portion 14a contiguous with a second portion 14b. The first and second portions 14a, 14b may be equal in length and are shown to be longer than the free ends 16a, 16b of the strap 12. The free ends 16a, 16b of the strap 12 may be equal in length. It should be appreciated that the exact dimensions of the strap 12 are provided for illustrative purposes and are not provided to limit the scope of the appended claims. For instance, the strap 12 may be wider or thicker based upon the desired pulling load performance. Additionally, the size and length of the loops 14 and 20 may vary.

Alternatively, the attachment member may have a modified structure, as depicted in FIGS. 6-9. In the depicted embodiment, the body 22, and support arms 24 are as described above with reference to FIGS. 1-3. As described above, the attachment member 18 may be formed by a rod 26. The rod 26 is formed of a rigid and durable material such as steel, or a composite material such as carbon fiber. The support arms 24 are formed by the rod 26. The rod 26 is bent about the middle so as to form a first elongated member 28 and a second elongated member 30. The first elongated member 28 is spaced apart from and generally parallel to the second elongated member 30 so as to form a support slit 32. Also, as described above, the body 22 is also formed by a rod 26. The rod 26 is formed of a rigid and durable material such as steel, or a composite material such as carbon fiber. The rod 26 includes a base 34 and a pair of legs 36 disposed on opposing sides of the base 34. The legs 36 curve inwardly towards each other so as to form a generally U-shaped dimension. Each leg 36 of the rod 26 has an end portion 36a. The end portion 36a is curved outwardly from each other, forming a shape similar to that of a horse shoe. The first elongated members 28 of the rod 26 are contiguous with the end portion 36a of a respective leg 36. The depicted embodiment of FIGS. 6-8 differs slightly in that the base 34 is more circular in shape and the first elongated members 28 are canted at an angle as opposed to more horizontally positioned elongated members 28 depicted in FIGS. 1-3. Additionally, the second elongated members 30 of FIGS. 6-8 may be attached to the legs 36 using a weld 37, such as a filet weld.

Figure 5:
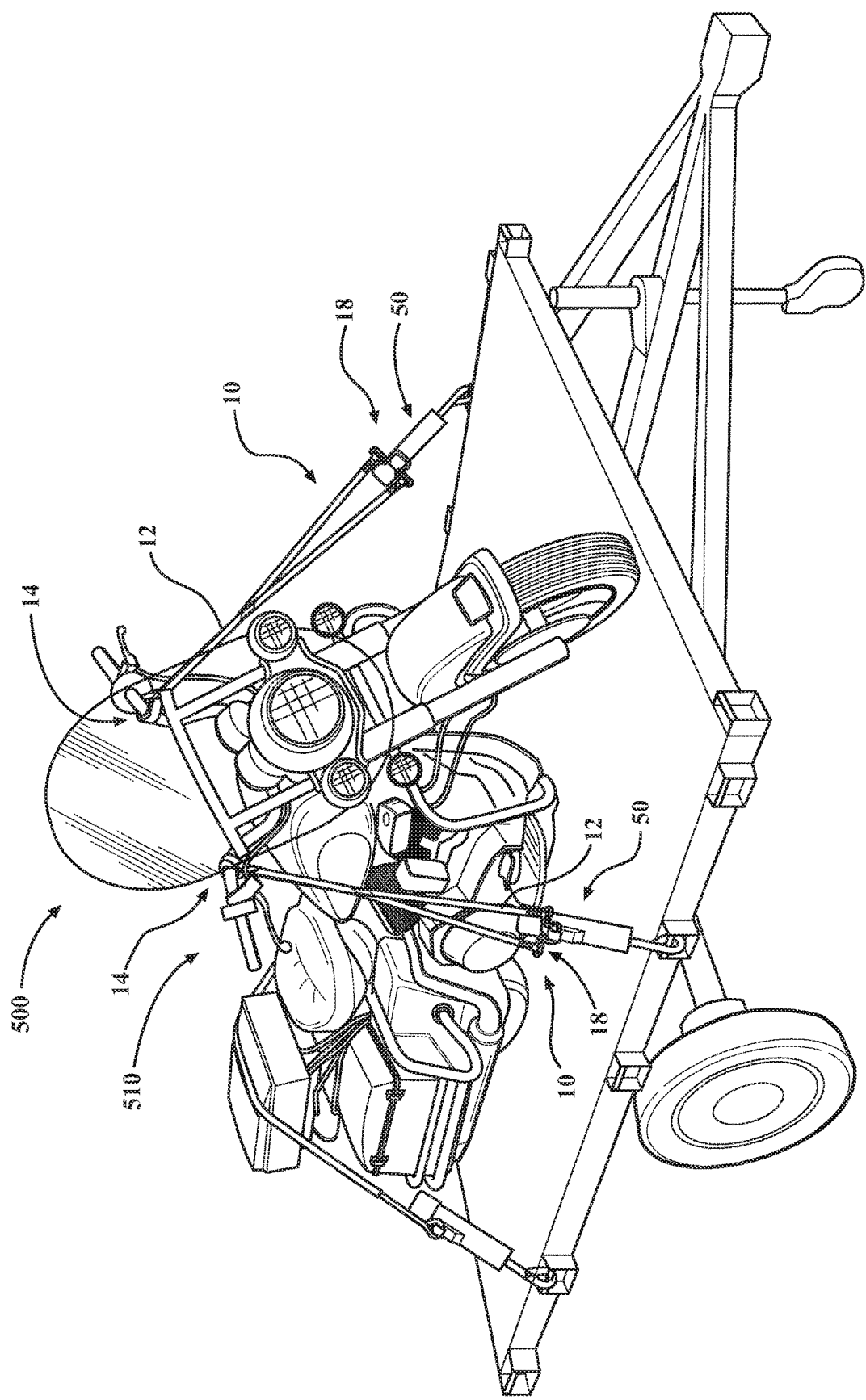
FIG. 5 is an illustrative view showing the strap secured to a load.
Figure 6:
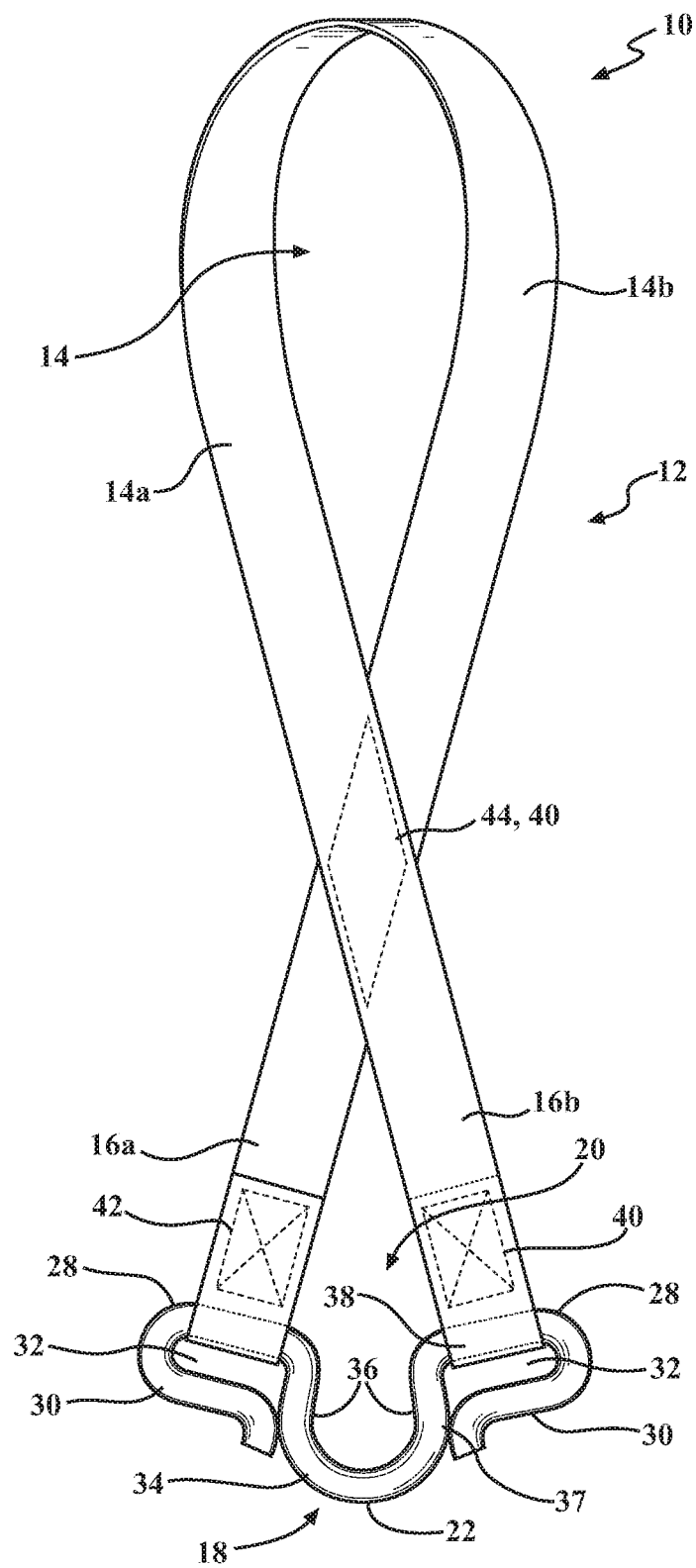
FIG. 6 is a front view of the device having a modified attachment member.
Figure 7:
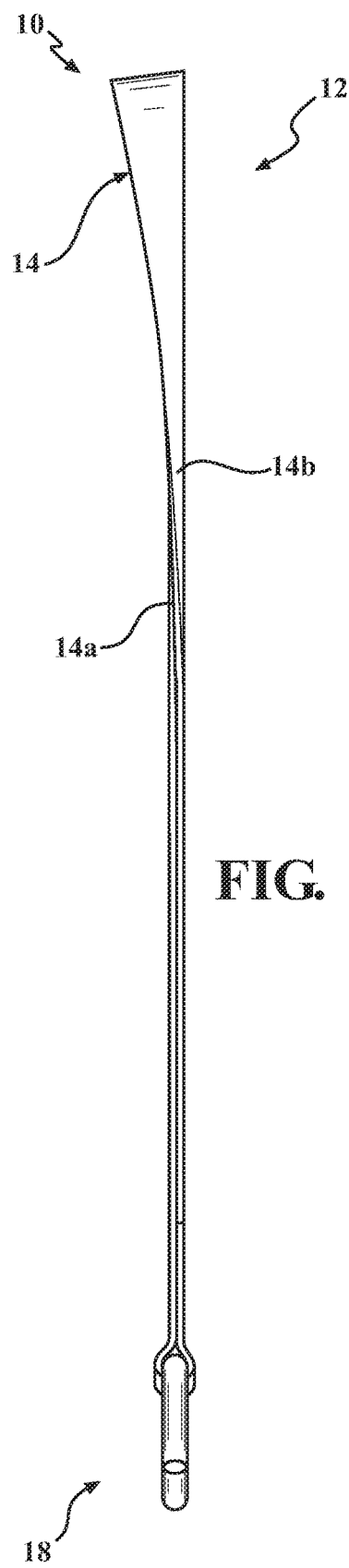
FIG. 7 is a side view of the device having a modified attachment member.

With reference now to FIG. 5, an illustrative view showing the device 10 attached to a load 500 is provided. For illustrative purposes, the load 500 is shown as a motorcycle mounted on a trailer 600. FIG. 5, shows the device 10 attached to each handle bar 510 of the motorcycle 500. In particular, the strap 12 is wrapped around the handle bar 510 and the attachment member 18 is passed through the first loop 14. The attachment member 18 is then pulled through the first loop 14, cinching the strap 12 onto the handle bar 510. An attachment device 50 is secured to the trailer 600 and the attachment member 18, securing the motorcycle 500 to the trailer 600.

Figure 4:
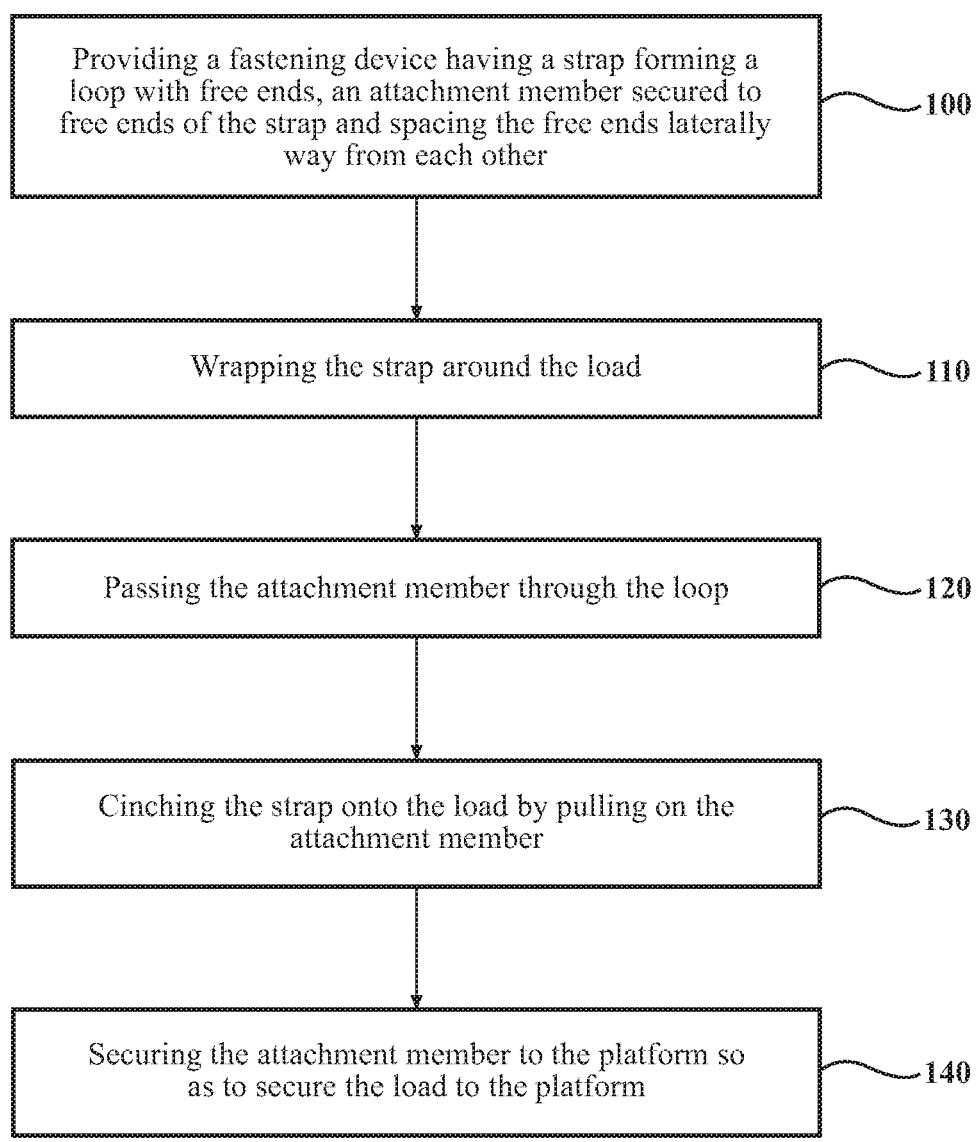
FIG. 4 is a diagram showing the steps in a method of securing a load to a platform.

With reference now to FIG. 4, a method for securing a load to a platform is provided. The method proceeds to step 100, wherein the device 10 described herein, illustratively shown in FIGS. 1-3, and 5, is provided. The method proceeds to step 110 wherein the strap 12 is wrapped around a load 46, as shown in FIG. 5. The method proceeds to step 120, wherein the attachment member 18 is passed through the first loop 14. The method proceeds to step 130, wherein the attachment member 18 is pulled through the first loop 14, cinching the strap 12 onto the load. The method proceeds to step 140 wherein the attachment member 18 is secured to a supporting structure. In the depicted embodiment, the supporting structure is a platform of a trailer onto which the motorcycle is secured. It should be realized that the device 10 may be utilized to attach to various loads or objects and may be secured to a variety of supporting structures. For example, the device may be secured around an object and then mated with another strap or chain to apply a force to the object such as using a pulley or other device. Additionally, the device 10 may be utilized to attach to an object and then attach the object to other supporting structures such as a tie down device 50 or turn buckle as depicted in FIG. 5.

The method may also include the step of providing an attachment device 50, the attachment device 50 is configured to secure the attachment member 18 to the platform. Any attachment device 50 currently known or used in the art may be adapted for use herein, illustratively including a tie down, or the attachment device 50 shown in FIG. 5.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

I claim:

1. A device configured to secure a load to a supporting structure, the device comprising:
a strap crossing and permanently fixed onto itself defining an intersection so as to form a first loop and a pair of diverging laterally spaced free ends;
a contiguous rod attachment member having a body, wherein the body is formed by a rod, the rod having a base and a pair of legs disposed on opposing sides of the base, the legs are curved inwardly towards each other so as to form a generally U-shaped dimension, the body having a pair of support arms disposed on opposite ends of the body, wherein each of the legs of the rod have an end portion, the end portion being curved outwardly from each other, the first elongated members of the rod contiguous with the end portion of a respective leg, each of the pair of free ends of the strap are fixed to a corresponding support arm wherein the pair of free ends are laterally spaced apart from each other defining a second loop and a generally figure eight dimension.

2. The device as set forth in claim 1 wherein each of the pair of support arms is a rod, the rod is bent so as to form a first elongated member and a second elongated member, the first elongated member spaced apart from the second elongated member defining a support slit.

3. The device as set forth in claim 1 wherein each of the free ends of the strap are secured onto the strap so as to form a strap slit, the strap slit attached to the support arms.

4. The device as set forth in claim 1, wherein the strap is secured onto itself by a stitching.

5. The device as set forth in claim 1, wherein the strap is secured onto itself by an adhesive.

6. The device as set forth in claim 1, further including a clamping device, the clamping device having a first clamp configured to be attached to a second clamp, the first and second clamp pinching and fixing the strap onto itself.

7. The device as set forth in claim 1, wherein the loop includes a first portion contiguous with a second portion, the first and second portions are equal in length and are longer than the free ends of the strap.

8. The device as set forth in claim 7, wherein the free ends of the strap are equal in length.

* * * * *